(12) United States Patent
Tsai et al.

(10) Patent No.: US 6,340,952 B1
(45) Date of Patent: Jan. 22, 2002

(54) INDUCED LOOP ANTENNA

(75) Inventors: Szu-Nan Tsai; Hsiang-Hui Shen; Hsin Kuo Dai; Ku Te Cheng, all of Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/730,021

(22) Filed: Dec. 4, 2000

(30) Foreign Application Priority Data

Oct. 20, 2000 (TW) .......................................... 089122144

(51) Int. Cl.⁷ ............................................... H01Q 11/12
(52) U.S. Cl. ........................ 343/741; 343/702; 343/866
(58) Field of Search ................................. 343/741, 742, 343/866, 702, 867, 743, 744, 787, 788; H01Q 1/24, 1/36, 1/38, 11/12

(56) References Cited

U.S. PATENT DOCUMENTS

| | | | | | |
|---|---|---|---|---|---|
| 3,906,507 A | * | 9/1975 | Allen | ......................... | 343/705 |
| 4,479,127 A | * | 10/1984 | Barbano | ....................... | 343/742 |
| 5,206,657 A | * | 4/1993 | Downey | ....................... | 343/742 |
| 5,751,255 A | * | 5/1998 | Carter | .......................... | 343/866 |
| 5,826,178 A | * | 10/1998 | Owen | ........................ | 455/193.1 |
| 6,016,128 A | * | 1/2000 | Imamura et al. | ............. | 343/741 |
| 6,104,349 A | * | 8/2000 | Cohen | ......................... | 343/702 |

\* cited by examiner

Primary Examiner—Tho Phan
(74) Attorney, Agent, or Firm—Wei Te Chung (57) ABSTRACT

A loop antenna assembly (2) for an electronic device includes a primary assembly (21) and an assistant assembly (22) mounted perpendicular to the primary assembly. The primary assembly includes a primary printed circuit board (PCB) (210) with a planar, monopole antenna in the form of a first circuit trace (211) fixed thereon, a feeder cable (212) and a connector (215). The assistant assembly includes an assistant PCB (220) with a second circuit trace (222) and an auxiliary wire (221), which extends parallel to the primary PCB and couples with the monopole antenna on the primary PCB to form a loop for high frequency signal transmission.

11 Claims, 9 Drawing Sheets

INDUCED LOOP ANTENNA

FIELD OF THE INVENTION

The present invention relates to a loop antenna, and particularly to an induced loop antenna mounted in a portable electronic device and operating in the ISM (Industry, Science, Medicine) frequency band for communicating with various electronic devices.

BACKGROUND OF THE INVENTION

Figure 10:
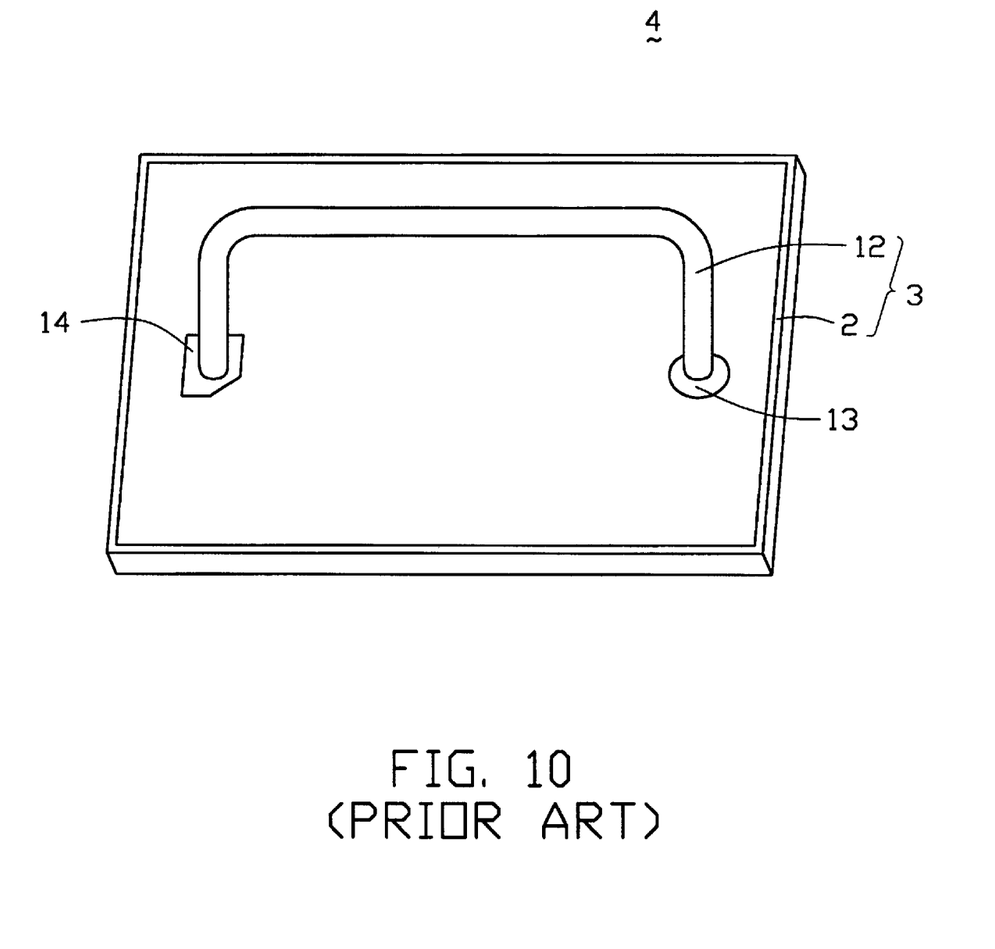
FIG. 10 shows a conventional loop antenna.

Conventional loop antennas generally have conductive loop circuits fixed on printed circuit boards. Such a conventional loop antenna is disclosed in U.S. Pat. No. 5,767,813. Referring to FIG. 10, a loop antenna 4 includes a radiation device 3 and two connectors 13, 14 respectively providing an electrical interface to associated electronic circuitry (not shown). The radiation device 3 includes a conductive planar base element 2 formed on a non-conducting base and extending in a base plane and a conductive loop 12 electrically connected to the planar base element 2. The electrical current conducted in the antenna 4 flows through both the conductive loop 12 and the planar base element 2.

However, this design requires connectors mounted on a base of printed circuit board material and a conductive loop lying in a loop plane perpendicular to the base plane of the base element, so it goes against the trend in electronic devices toward miniaturization and makes the manufacture more complicated. Furthermore, the useable frequency bandwidth of a loop antenna with this fixed structure cannot be adjusted.

The present invention is directed to solving the above problems and satisfying the need for a simple and adjustable loop antenna of the character described.

BRIEF SUMMARY OF THE INVENTION

A primary object, therefore, of the present invention is to provide an improved loop antenna suitable for different conditions and having an adjustable frequency bandwidth.

Another object is to provide a method for converting a primary monopole antenna assembly into an induced loop antenna without changing the basic dimensions of the monopole antenna.

A further object is to provide a loop antenna which occupies a small space and has a simplified manufacture.

A loop antenna in accordance with the present invention comprises a primary assembly and an assistant assembly. The primary assembly includes a primary printed circuit board (PCB) with a radiation device in the form of a first circuit trace thereon, a connector for providing an electrical interface to an electronic device, and a cable connecting the primary PCB with the connector. The assistant assembly includes an assistant PCB extending substantially perpendicular to the primary PCB and having a second circuit trace thereon, and an auxiliary wire attached to the second circuit trace and coupling with the radiation device on the primary PCB to form an induced loop antenna for high frequency signal transmission. The bandwidth (B.W.) of the loop antenna can be adjusted by changing the length of the auxiliary wire.

Other objects, advantages and novel features of the invention will become more apparent from the following detailed description when taken in conjunction with the accompanying drawings.

DETAILED DESCRIPTION OF THE INVENTION

Figure 1:
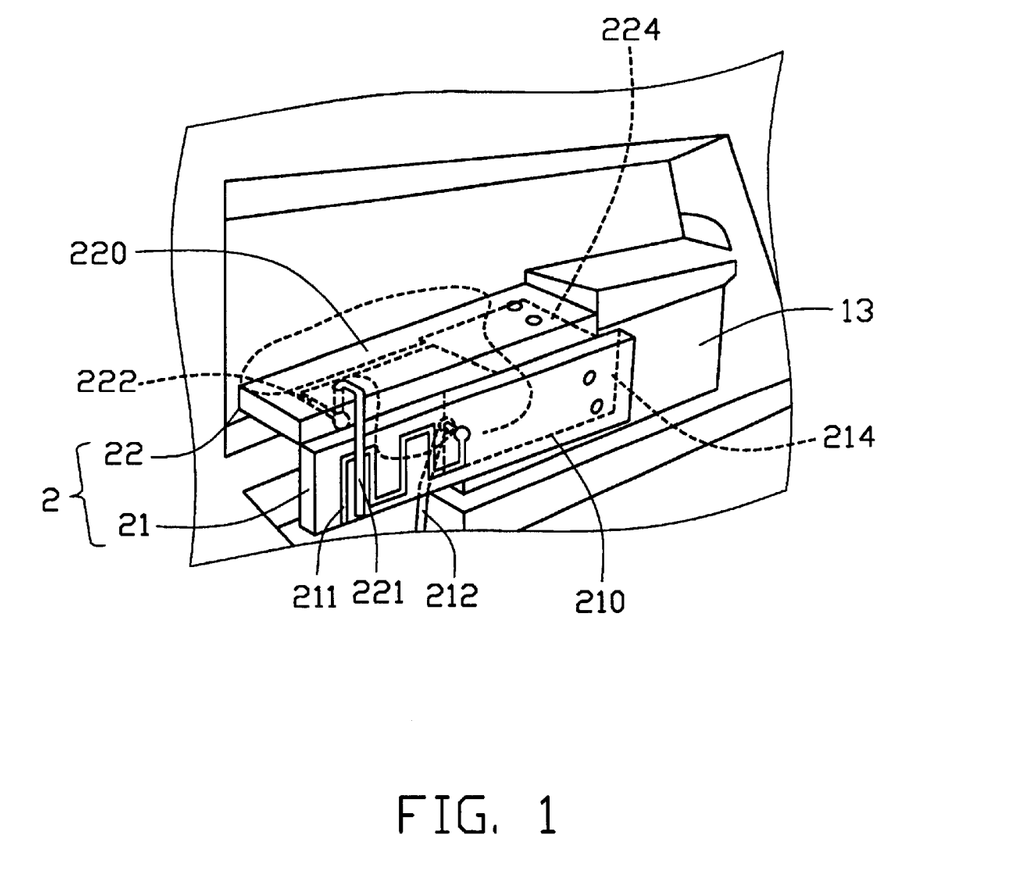
FIG. 1 shows a loop antenna formed with primary assembly and an assistant assembly.
Figure 2:
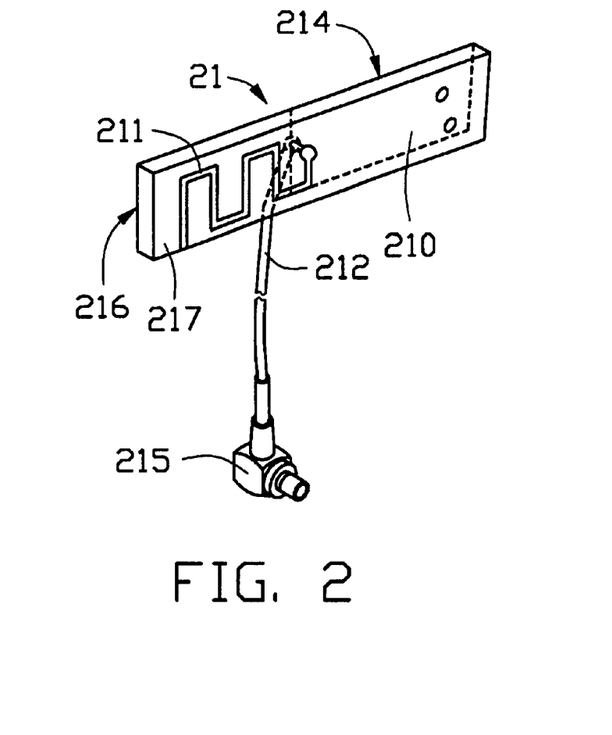
FIG. 2 is a perspective view of the primary assembly used in the present invention.
Figure 3:
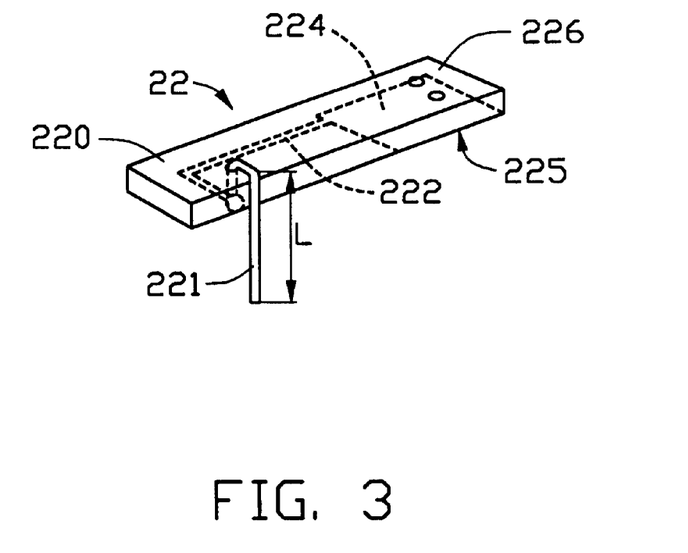
FIG. 3 is a perspective view of the assistant assembly of the present invention.

Referring to FIGS. 1, 2 and 3, a loop antenna assembly 2 in accordance with the present invention comprises a primary assembly 21 and an assistant assembly 22 mounted in a fixed relation to and perpendicular to the primary assembly 21.

Particularly referring to FIG. 2, the primary assembly 21 includes a primary printed circuit board (PCB) 210, a connector 215 for providing an electrical interface to an RF circuitry (not shown) and a cable 212 connecting the primary PCB 210 with the connector 215. A first circuit trace 211, which has a serpentine configuration, is attached on a front surface 217 of the primary PCB 210 and acts as a radiation device of the primary assembly 21. A first metal foil 214 is attached on a rear surface 216 of the primary PCB 210 for providing an electrical interface to the assistant assembly 22. In this embodiment, the cable serves as an RF feeder of the primary assembly 21 and is a coaxial cable. An inner core wire of the cable 212 is soldered to the first circuit trace 211, and an outer shield of the cable 212 is soldered to the first metal foil 214.

Particularly referring to FIG. 3, the assistant assembly 22 includes an assistant PCB 220 and an auxiliary wire 221. A second metal foil 224 is attached on a bottom surface 225 of the assistant PCB 220. A second circuit trace 222 is connected with the second metal foil 224 on the bottom surface 225. The auxiliary wire 221 connects with the second circuit trace 222 and extends from a top surface 226 of the assistant PCB 220. The auxiliary wire 221 bends downwardly and perpendicularly to the assistant PCB 220.

Figure 5:
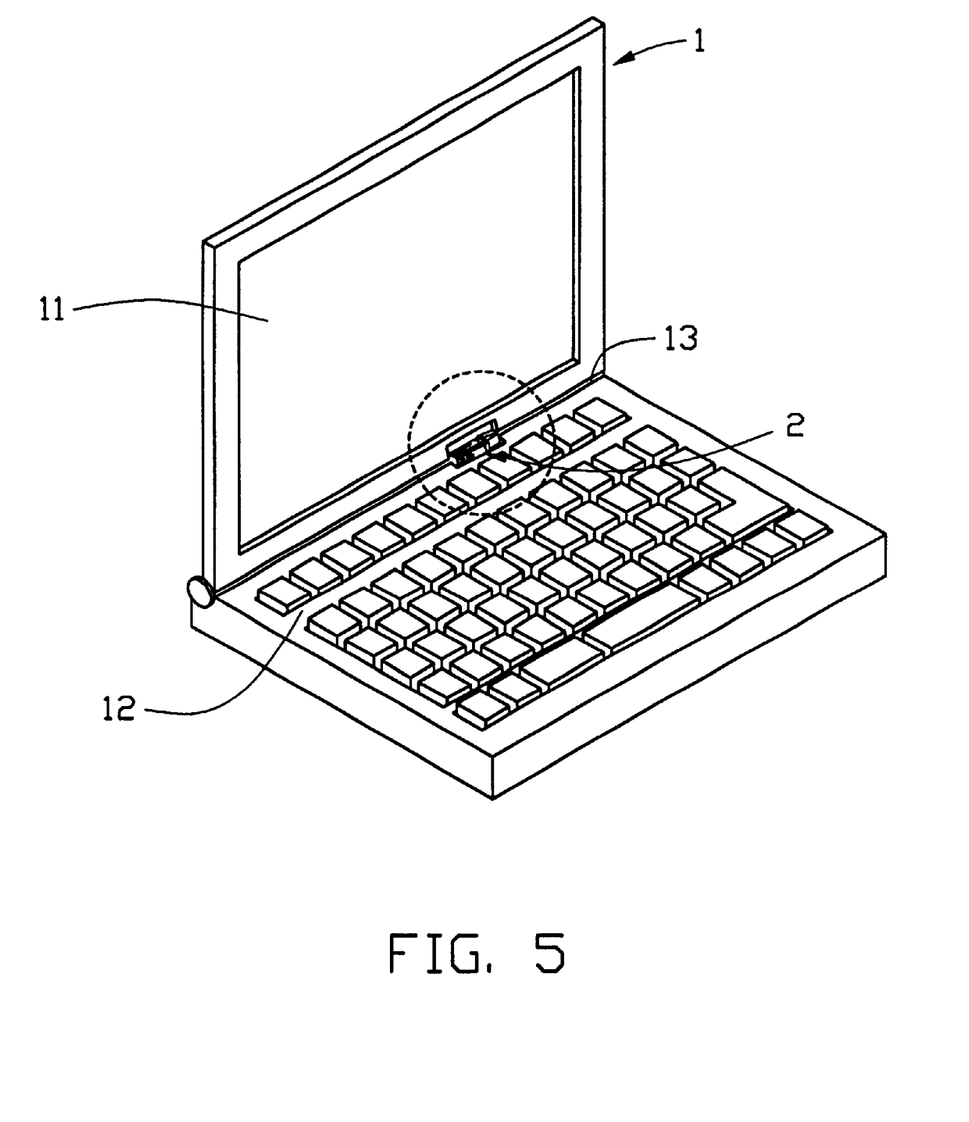
FIG. 5 shows a loop antenna module of the present invention being assembled in a notebook.

Referring to FIG. 5, a notebook 1 comprises a mainframe unit 12, a hinge base 13 fixed to the mainframe unit 12 and a Liquid Crystal Display (LCD) panel 11 pivotably connected to the hinge base 13 so that the LCD panel 11 is rotatable with respect to the mainframe unit 12 between opened and closed positions.

Figure 4:
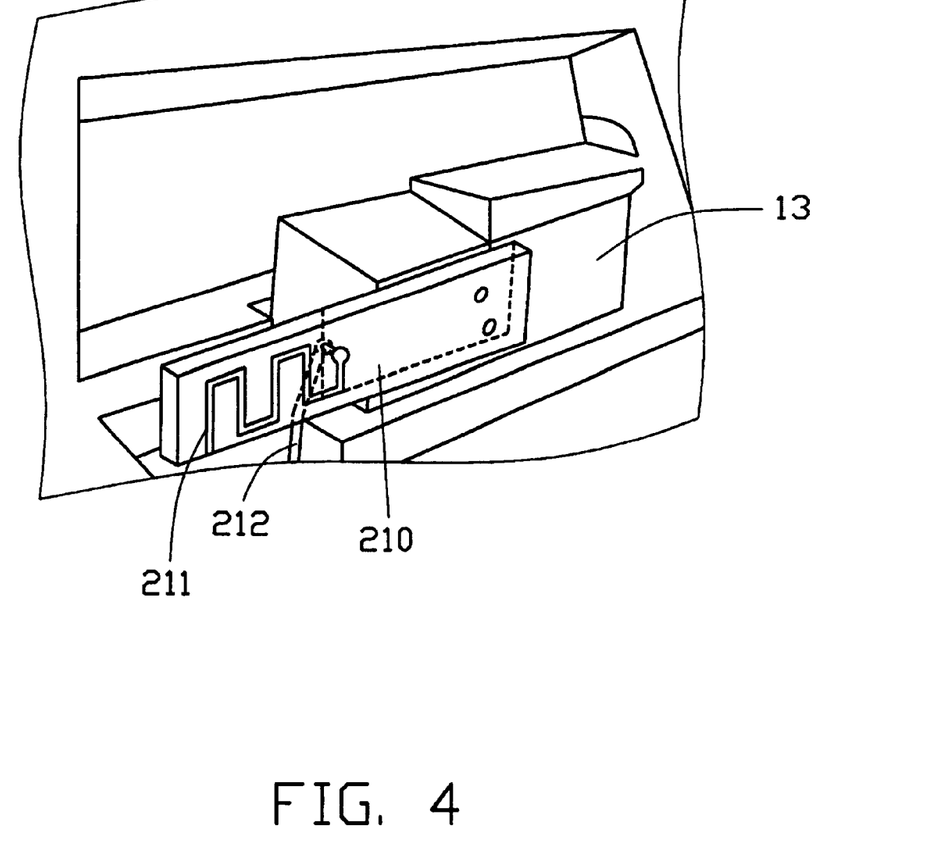
FIG. 4 is a perspective view of the primary assembly being assembled on a hinge of a notebook.

In assembly, referring to FIGS. 1, 4 and 5, the primary PCB 210 is fixed on a front surface of the hinge base 13 of the notebook 1 by screws (not shown) extending through the primary PCB 210, or by any other suitable means, with the rear surface 216 contacting the hinge base 13. The assistant PCB 220 is fixed by screws (not shown) or any other suitable means to an upper surface of the hinge base 13 so as to be substantially perpendicular to the primary PCB 210 and with the bottom surface 225 contacting the hinge base 13. The auxiliary wire 221 is parallel to the primary PCB 210 and extends parallel to a portion of the first circuit trace 211 without contacting the first circuit trace 211.

Referring to FIG. 1, the hinge base 13 in the embodiment shown is made from a conductive material and electrically connects the first metal foil 214 with the second metal foil 224. However, it is contemplated that other suitable means may be employed to achieve this electrical connection. For example, the hinge base 13 may itself be non-conductive and a separate conductive element may be used. The auxiliary wire 221 and the second circuit trace 222 inducts with the first circuit trace 211 on the primary PCB 210. With the induction, a loop is established between the monopole antenna of the primary assembly 21 and the assistant assembly 22. The monopole antenna is thus converted into the loop antenna 2 for high frequency signal transmission. The Bandwidth (B.W.) of the loop antenna assembly 2 can be adjusted by changing the length of the auxiliary wire 221.

Working within the ISM (Industry, Science, Medicine) frequency band of 2.4~2.5 GHz, the reflection loss is more than 10 dB and the Voltage Standing Wave Ratio (VSWR) is less than 2.0.

Figure 6:
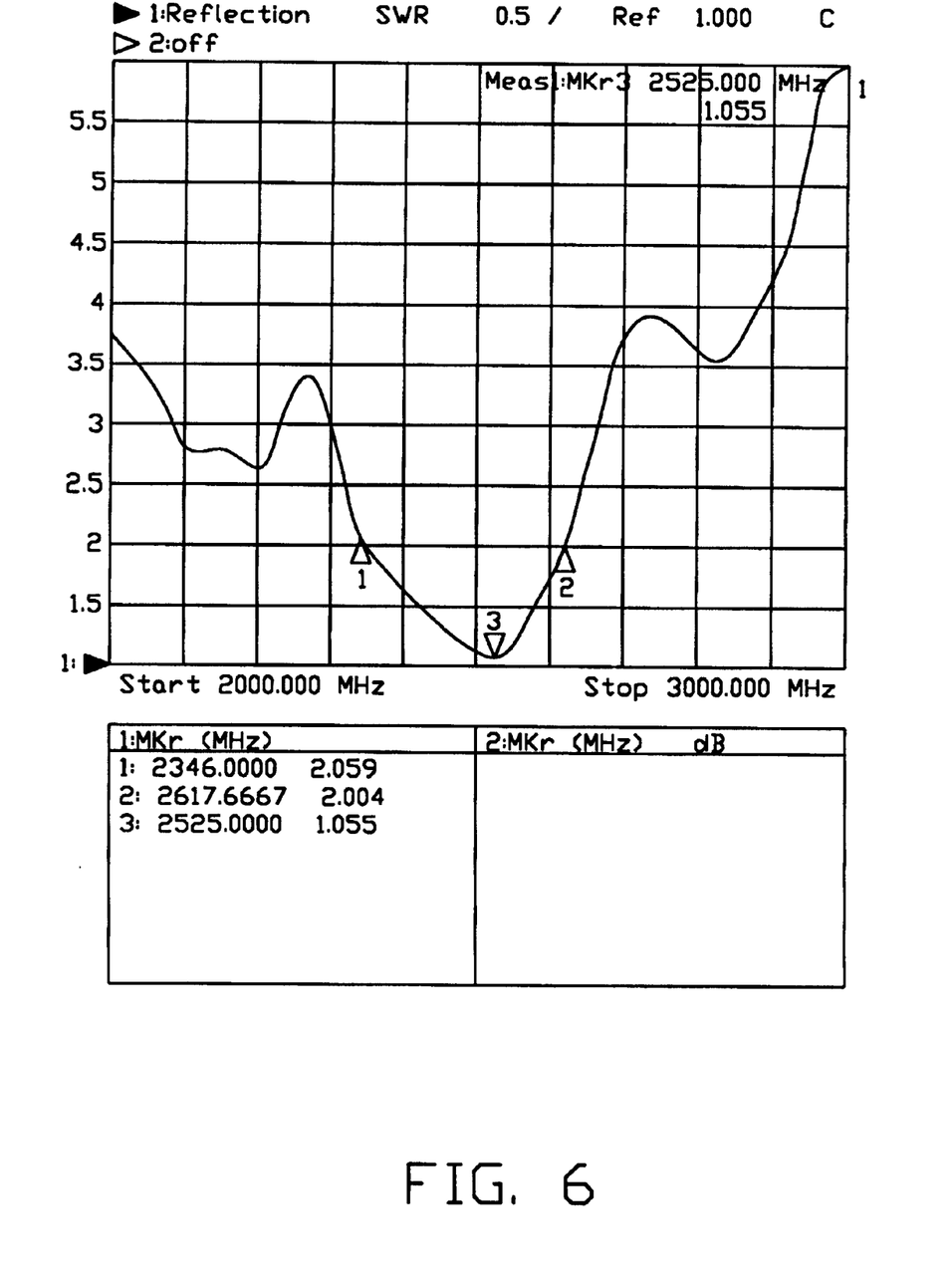
FIG. 6 is a graph of experimental data disclosing the relationship between frequency and Voltage Standing Wave Ratio (VSWR) of the loop antenna when a Liquid Crystal Display (LCD) panel of the notebook is open relative to a mainframe unit.

The experimental data of FIG. 6 was obtained when the LCD panel 11 of the notebook 1 was open relative to the mainframe unit 12. The loop antenna assembly 2 communicated in a frequency band of 2346~2617 MHz, where the VSWR was less than 2.0.

Figure 7:
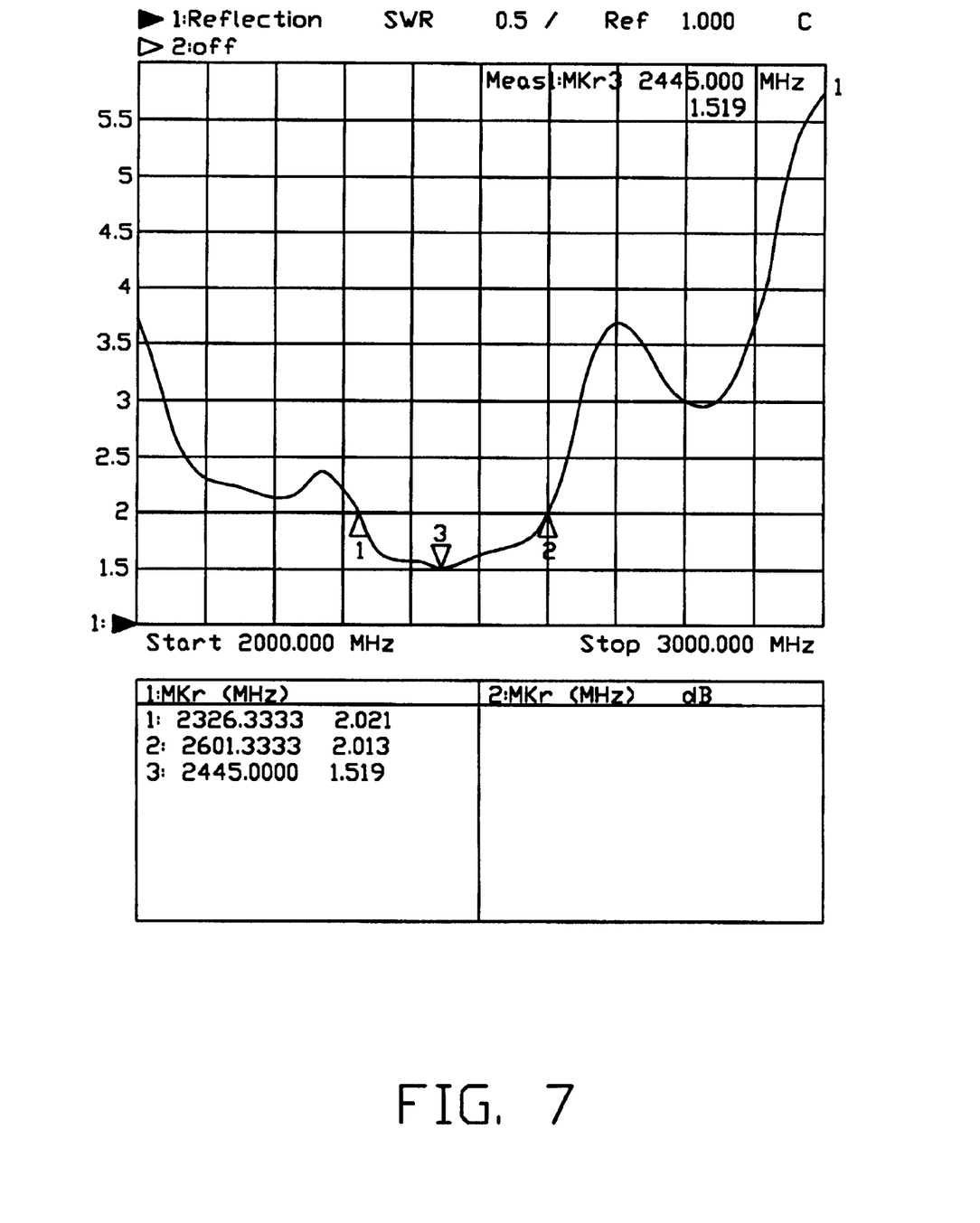
FIG. 7 is a graph of experimental data disclosing the relationship between frequency and VSWR of the loop antenna when the LCD panel of the notebook is closed relative to the mainframe unit.

The experimental data of FIG. 7 was obtained when the LCD panel 11 of the notebook 1 was closed relative to the mainframe unit 12. The loop antenna assembly 2 communicated in the frequency band of 2326~2601 MHz, where the VSWR was less than 2.0.

As shown in FIGS. 6 and 7, the VSWR was less than 2.0 in the frequency band of 2.4~2.5 GHz, regardless of the relative position of the LCD panel 11 to the mainframe unit 12. In other words, the relative position of the LCD panel 11 to the mainframe unit 12 does not prevent the loop antenna assembly 2 constructed in accordance with the present invention from communicating in the band of 2.4~2.5 GHz.

Figure 8:
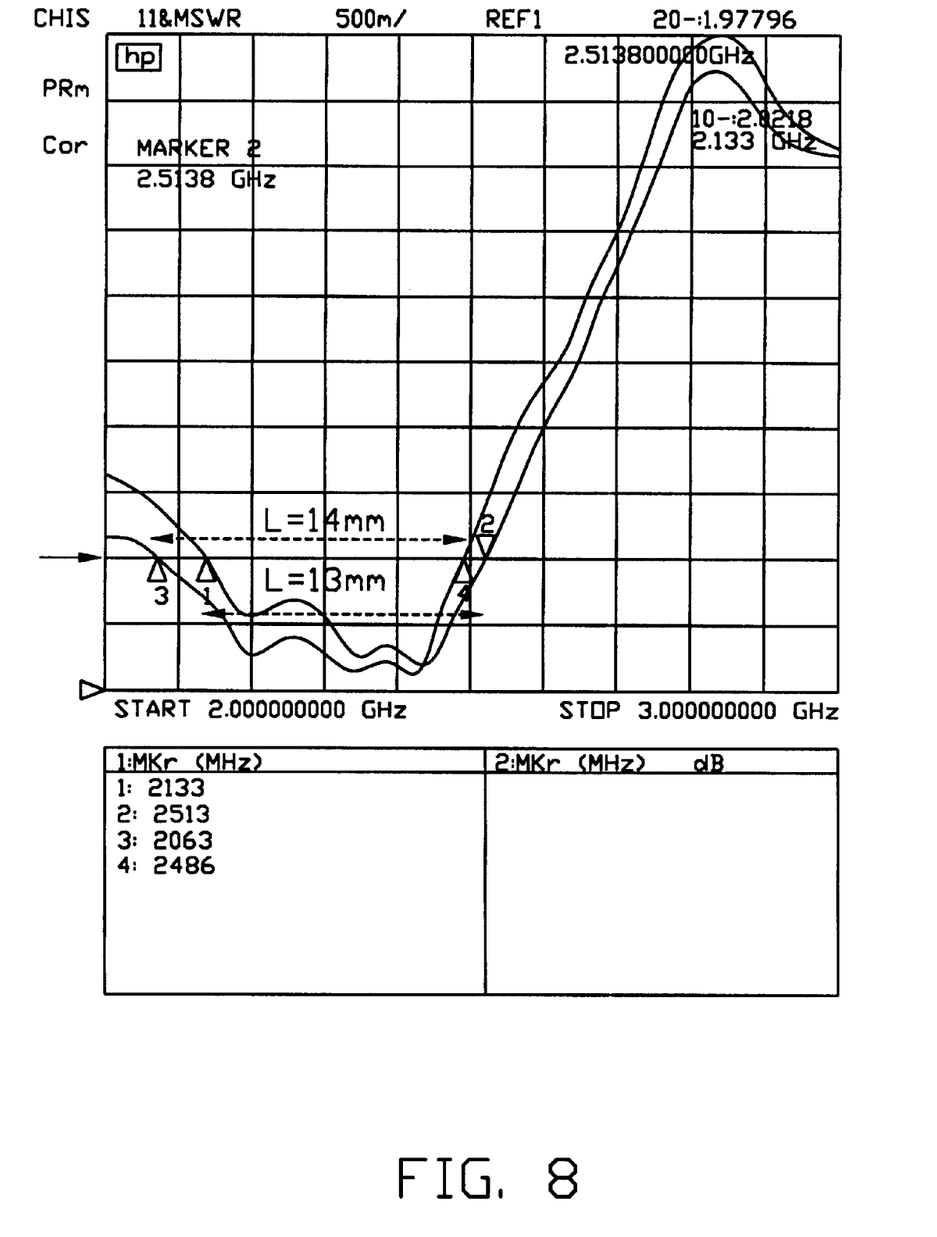
FIG. 8 is a graph of experimental data disclosing useable frequency bandwidth as a function of the length of a wire extending from the assistant PCB when the LCD panel of the notebook is open relative to the mainframe unit.

The experimental data of FIG. 8 was obtained when the LCD panel 11 of the notebook 1 was open relative to the mainframe unit 12. When the length of the auxiliary wire 221 was 14 mm, the loop antenna assembly 2 communicated in a frequency band of 2063~2486 MHz, where the VSWR was less than 2.0. When the length of the auxiliary wire 221 was 13 mm, the loop antenna communicated in a frequency band of 2133–2513 MHz, where the VSWR was less than 2.0.

Figure 9:
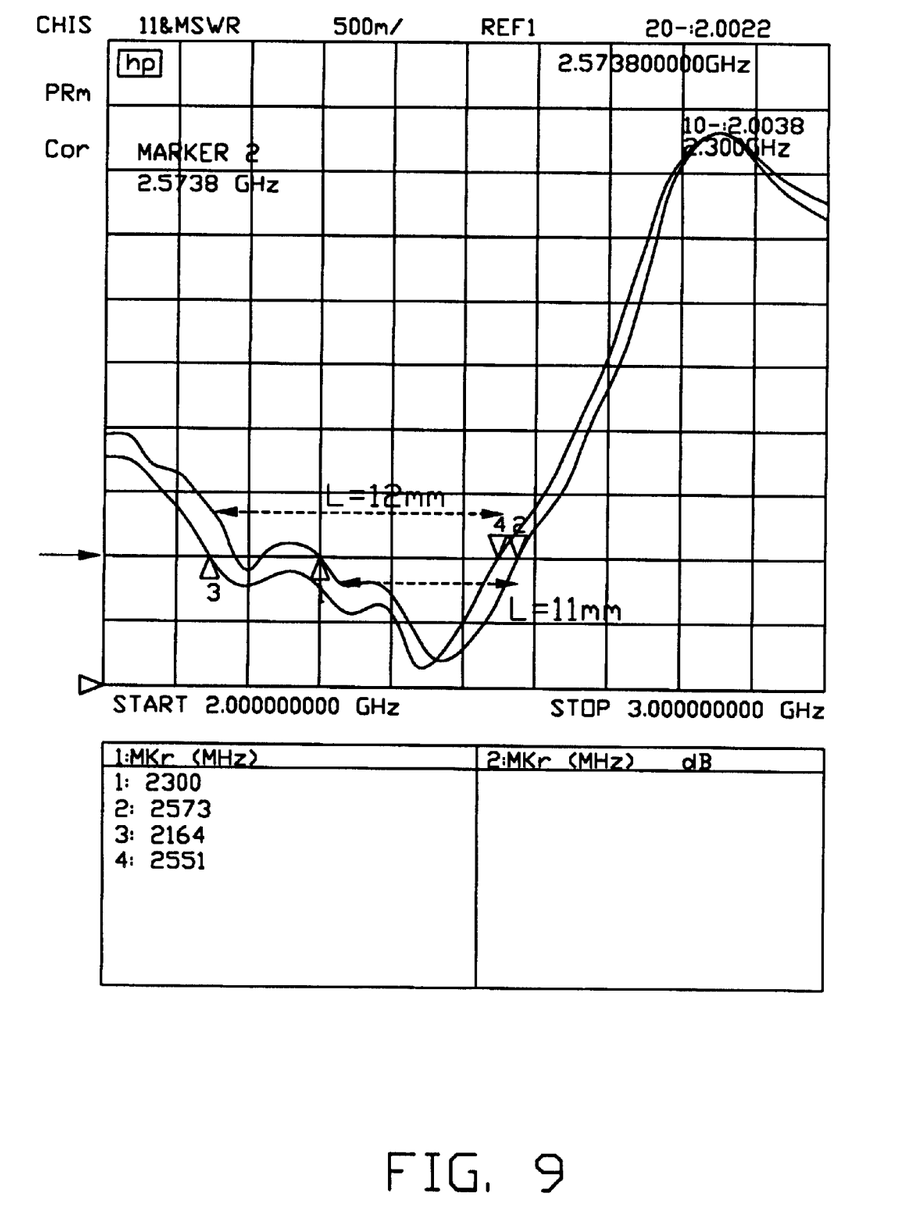
FIG. 9 is another graph of experimental data disclosing useable frequency bandwidth as a function of the length of the wire extending from the assistant PCB when the LCD panel of the notebook is open relative to the mainframe unit.

The experimental data of FIG. 9 was obtained when the LCD panel 11 of the notebook 1 was open relative to the mainframe unit 12. When the length of the auxiliary wire 221 was 12 mm, the loop antenna assembly 2 communicated in a frequency band 2164–2551 MHz, where the VSWR was less than 2.0. When the length of the auxiliary wire 221 was 11 mm, the loop antenna communicated in a frequency band of 2300–2573 MHz, where the VSWR was less than 2.0.

The experiment data shows that the useable frequency band of the loop antenna assembly 2 shifts when the length of the auxiliary wire 221 changes.

The present invention can be applied with various wireless communication protocols, such as Bluetooth and Wireless LAN. Additionally, the loop antenna assembly 2 of the present invention is directly mounted on the hinge base 13, thereby saving space occupied in the notebook 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An induced loop antenna assembly for an electronic device, comprising:
   a primary assembly, including:
      a primary printed circuit board (PCB) with a radiation device thereon;
      a connector for providing an electrical interface to an RF circuitry; and
      a cable connecting the primary PCB with the connector; and
   an assistant assembly including:
      an assistant printed circuit board (PCB) extending substantially perpendicular to the primary PCB; and
      an auxiliary wire attached to the assistant PCB;
   wherein the auxiliary wire has a grounded end and couples with the radiation device, the radiation device electrically connects with the RF circuitry via the connector and the RF circuitry has a common ground with the auxiliary wire, thereby forming an induced loop for high frequency signal transmission.

2. The induced loop antenna assembly as claimed in claim 1, wherein the radiation device is a planar monopole radiation device.

3. The induced loop antenna assembly as claimed in claim 1, wherein the radiation device is a first circuit trace which has a serpentiform configuration and is attached on a front surface of the primary PCB.

4. The induced loop antenna assembly as claimed in claim 3, wherein the primary PCB is fixed on one surface of a hinge base of a notebook with a rear surface of the primary PCB contacting with the hinge base, and the assistant PCB is fixed on another adjacent surface of the hinge base perpendicular to the primary PCB with a bottom surface of the primary PCB contacting with the hinge base, and wherein the auxiliary wire is parallel to the primary PCB and extends parallel to a portion of the first circuit trace without contacting the first circuit trace.

5. The induced loop antenna assembly as claimed in claim 1, wherein the auxiliary wire extends parallel to a portion of the radiation device, and inductively couples with said portion of the radiation device.

6. The induced loop antenna assembly as claimed in claim 1, wherein a first metal foil is attached on a rear surface of the primary PCB for providing an electrical interface to the assistant PCB.

7. The induced loop antenna assembly as claimed in claim 6, wherein the cable of the primary assembly comprises an inner core wire soldered to the radiation device and an outer shield soldered to the first metal foil.

8. The induced loop antenna assembly as claimed in claim 7, wherein the assistant PCB comprises a second metal foil attached on a bottom surface thereof and a second circuit trace connected with the second metal foil, and wherein the auxiliary wire connects with the second circuit trace and extends from a top surface of the assistant PCB.

9. The induced loop antenna assembly as claimed in claim 8, wherein the first and second metal foils are connected to ground.

10. An induced loop antenna assembly for use with an electronic device, comprising:
   a primary assembly including:
      a primary printed circuit board with a radiation device and a ground area thereon;
      a cable connected between said primary printed circuit board and an RF circuitry, said cable including an inner core wire and an outer shield respectively electrically connected to the radiation device and the ground area;
   an assistant assembly including:
      an assistant printed circuit board with a ground region thereon; and
      an auxiliary wire attached to the assistant printed circuit board and electrically connected to said ground region while spatially disposed parallel to said radiation device with a selectively predetermined length so as to create an induced loop antenna effect and adjustably achieve thereof a voltage standing wave ratio being smaller than 2.0 for a selectively specific bandwidth range.

11. A method of making an antenna assembly with a voltage standing wave (VSWR) ratio under 2.0, comprising the steps of;
   (A) providing a primary assembly with a primary printed circuit board having a radiation device and a ground area thereon;
   (B) providing a cable with an inner core wire and an outer shield respectively electrically connected to the radiation device and said ground area;
   (C) providing an assistant assembly with a assistant printed circuit board having a ground region thereon;
   (D) providing an assistant wire with one end electrically connected to said ground region and another end extending parallel to said radiation device for induction of loop antenna; and
   (E) adjusting a length of said assistant wire so as to achieve VSWR<2.0 for a selected bandwidth range.

* * * * *